May 28, 1957     H. L. BARTHOLOMEW     2,793,888
ROD AND FIXTURE CONNECTOR
Filed April 19, 1955

INVENTOR.
Harvey L. Bartholomew.
BY
ATTORNEYS.

United States Patent Office 2,793,888
Patented May 28, 1957

2,793,888
ROD AND FIXTURE CONNECTOR
Harvey L. Bartholomew, Kansas City, Mo.
Application April 19, 1955, Serial No. 502,416
1 Claim. (Cl. 287—125)

This invention relates to fastening devices for connecting rods to fixtures or mounting fixtures on rods, and more particularly to a new and improved fastening means for removably attaching rods and like elongate members to knobs, eye members and like fixtures.

The objects of the present invention are to provide a novel connector having a rod end receiving socket and spaced groove forming members therein for holding engagement with the rod end; to provide a rod end and socket member therefor with partial screw-like projections in the socket member and arranged whereby when the rod end is inserted into the socket, the screw-like projections will form grooves longitudinally of the rod end and then upon relative rotation the screw-like projections will cut helical groves in the rod end to tighten and hold the rod end in the socket member; to provide such a socket member particularly adapted to receive tapered rod ends; and to provide a rod and fixture connector that is economical to manufacture and quickly and easily assembled to make a tight but removable connection.

In accomplishing these and other objects of the present invention, I have provided improved details of structure, the preferred form of which is illustrated in the accompanying drawings, wherein.

Figure 1:
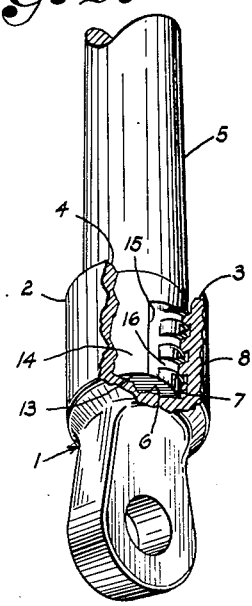
Fig. 1 is a perspective view of a rod and fixture embodying the features of the present invention, portions being broken away to illustrate the connector engagement.
Figure 2:
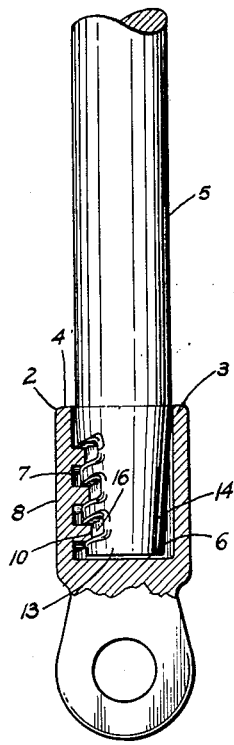
Fig. 2 is an elevational view of the rod and fixture with portions of the socket portion of the fixture broken away to illustrate the arrangement therein.
Figure 3:
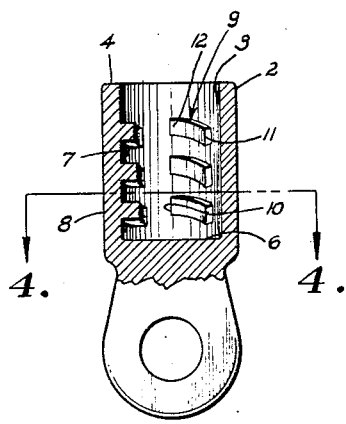
Fig. 3 is a longitudinal sectional view through the socket of the fixture.
Figure 4:
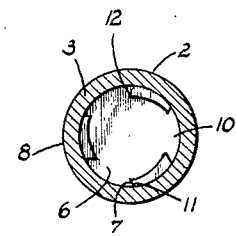
Fig. 4 is a transverse sectional view through the socket member on the line 4—4, Fig. 3.

Referring more in detail to the drawings:

1 designates a fixture such as an eye member having an end portion or socket member 2 provided with a socket 3 opening from the end 4 thereof. It is to be understood that the eye member is exemplary only as the member 1 may be a knob, clevis or other fixture adapted to be mounted on an elongated member such as a rod 5.

The socket 3 of the fixture 1 is preferably substantially circular in cross section and terminates as at 6. A plurality of dies or locking lugs 7 are integral with the side walls 8 of the socket member and extend inwardly therefrom. The lugs 7 are preferably arranged in rows 9 longitudinally of the socket with a plurality of the lugs in each row 9 and a plurality of rows spaced circumferentially of the interior of the socket 3. In the illustrated structure, there are three rows of lugs and three lugs in each row. Each of the lugs slope relative to a plane transversely of the socket whereby the lugs are in the form of a partial helix such as screw threads with the leading end 10 having the greatest projection from the side wall 8 whereby the inner surface of the lugs slope to the trailing end 11 to provide clearance as later described. It is also preferable that the width of the lugs be progressively less from the leading end to the trailing end thereof. It is preferable that the fitting 1 be of suitable metal and formed in a manner whereby the leading end 10 be relatively hard or have a hard surface to form a cutting edge 12 capable of cutting grooves in softer metal or other material suitable for the rod 5.

The elongated member or rod 5 has an end portion 13 therein circular in cross section and of a size that will enter in the socket 3. In the illustrated structure, the rod end is tapered as at 14 to facilitate insertion thereof into the socket 3, with the smaller end of the taper being of a diameter slightly greater than the circle defined by the cutting or leading edges 12 of the dies or locking lugs adjacent the inner end of the socket 3.

In assembling the fixture 1 on a rod 5, the tapered end of the rod is inserted in the socket 3, and then the fixture and rod are driven together in a manner that the dies or locking lugs 7 will cut longitudinal grooves 15 in the rod end. Then the rod 5 is rotated in the socket by turning the rod to the right or clockwise when the slope on the lugs corresponds to the slope of a righthand thread. The rotation of the rod would be in the opposite direction if the slope of the lugs correspond to a lefthand thread. The relative rotation of the rod end fixture causes the dies or locking lugs 7 to cut partial helical grooves 16 in the rod end which also tend to pull the rod end further into the socket thereby making a very tight fit and also providing an engagement of the die or locking lug 7 with the grooves 16 in the rod end to lock the fixture and rod together. While the rod end 13 is shown as being tapered, plain cylindrical ends may be utilized.

When it is desired to remove the fixture 1 from the rod 5, the fixture is held and the rod 5 rotated in a direction reversely to that used for assembling same until the lugs 7 are positioned in the longitudinal grooves 15 and then the rod is merely pulled from the socket 3. This arrangement eliminates the time required for threading rods and the time required for matching and starting threaded parts, yet provides a positive connection to securely attach a fixture on a rod or the like.

What I claim and desire to secure by Letters Patent is:

A rod and fixture connector including, an elongate rod having an end portion circular in cross section, a fixture having a socket member thereon with side walls defining a socket of circular cross section closed at one end and open at the other end for receiving the end portion of the rod, an eye member on the socket member and extending from the closed end thereof, and a plurality of lugs integral within the socket side walls and arranged in a plurality of rows extending longitudinally and spaced circumferentially of the socket, said lugs each having leading end forming a cutting edge that is relatively harder than the end portion of the rod, the trailing portion of the lugs being of reduced size, the leading end of the lugs being arranged to define a circle smaller in diameter than the cross section of the end portion of the rod whereby the fixture is connected to the rod by forcing the rod end in the socket and rotating same less than the circumferential spacing of adjacent rows of lugs during which movement the lugs form longitudinal grooves and helical grooves extending therefrom in the rod end and having locking engagement with said helical grooves to hold the fixture on the rod.

References Cited in the file of this patent
UNITED STATES PATENTS

| | | |
|---|---|---|
| Re. 20,445 | Newmark | July 13, 1937 |
| 1,671,458 | Wilson | May 29, 1928 |
| 1,814,966 | Rosenberg | July 14, 1931 |

FOREIGN PATENTS

| | | |
|---|---|---|
| 676,264 | Germany | May 31, 1939 |